(12) United States Patent
Wilcox et al.

(10) Patent No.: US 11,010,506 B2
(45) Date of Patent: May 18, 2021

(54) METHOD FOR DESIGNING A DIE SURFACE (71) Applicant: HEXAGON TECHNOLOGY CENTER GMBH, Heerbrugg (CH)

(72) Inventors: William Wilcox, New York City, NY (US); Derek Peeling, Burlington (CA)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 1041 days.

(21) Appl. No.: 15/472,092

(22) Filed: Mar. 28, 2017

(65) Prior Publication Data

US 2018/0285487 A1 Oct. 4, 2018

(51) Int. Cl.
*G06F 30/20* (2020.01)
*G06F 30/17* (2020.01)
(Continued)

(52) U.S. Cl.
CPC .............. *G06F 30/20* (2020.01); *G06F 30/17* (2020.01); *G06F 30/23* (2020.01); *G06N 5/04* (2013.01);
(Continued)

(58) Field of Classification Search
CPC .......... G06F 30/20; G06F 30/17; G06F 30/23; G06F 2111/10; G06F 2113/24;
(Continued)

(56) References Cited

U.S. PATENT DOCUMENTS

| 2003/0182005 A1* | 9/2003 | Chu ....................... B21D 37/20 700/97 |
| 2013/0291610 A1* | 11/2013 | Nardetto ................ G01B 11/26 72/31.1 |
| 2015/0134093 A1 | 5/2015 | Dos Reis Alipio Da Cruz |

FOREIGN PATENT DOCUMENTS

EP 1 348 499 A2 10/2003

OTHER PUBLICATIONS

Anggono, Agus Dwi et al., "Algorithm Development and Application of Spring Back Compensation for Sheet Metal Forming," Journal of Applied Sciences, Engineering and Technology, pp. 2036-2045 (2012) (Year: 2012).*

(Continued)

*Primary Examiner* — Rehana Perveen
*Assistant Examiner* — Steven W Crabb
(74) *Attorney, Agent, or Firm* — Maschoff Brennan (57) ABSTRACT

A method for designing a die surface of a die, comprising generating a workpiece simulation-model corresponding to the workpiece, generating a target simulation-model corresponding to a target formed part, determining an initial die surface, which an initial numerical simulation predicts as forming the workpiece simulation-model into the target simulation-model, determining residual stresses resulting from forming the workpiece simulation-model into the target simulation-model, forming the workpiece into an actual formed part, generating a numerical representation of the actual formed part, generating an actual simulation-model, based on the residual stresses, matching the actual simulation-model and the target simulation-model, based on deviations between the matched target simulation-model and actual simulation-model, modifying the initial numerical simulation to provide a modified numerical simulation, and determining a corrected die surface, which the modified numerical simulation predicts as forming the workpiece simulation-model into the target simulation-model.

10 Claims, 3 Drawing Sheets

(51) Int. Cl.
G06F 30/23 (2020.01)
G06N 5/04 (2006.01)
B21D 22/00 (2006.01)
B21D 37/20 (2006.01)
*G06F 111/10* (2020.01)
*G06F 113/24* (2020.01)
*G06F 119/18* (2020.01)

(52) U.S. Cl.
CPC .............. *B21D 22/00* (2013.01); *B21D 37/20* (2013.01); *G06F 2111/10* (2020.01); *G06F 2113/24* (2020.01); *G06F 2119/18* (2020.01); *Y02P 90/02* (2015.11)

(58) Field of Classification Search
CPC ... G06F 2119/18; G06F 2119/06; G06N 5/04; B21D 22/00; B21D 37/20; Y02P 90/265
See application file for complete search history.

(56) References Cited

OTHER PUBLICATIONS

Wei Gan et al., "Die design method for sheet springback", International Journal of Mechanical Sciences 46 pp. 1097-1113. (Year: 2004).*

European Search Report completed on Aug. 8, 2018 as received in Application No. 18162136.8.

* cited by examiner

PRIOR ART

METHOD FOR DESIGNING A DIE SURFACE

FIELD OF THE INVENTION

The present invention relates to a method and to a computer programme product for forming a workpiece into an actual part by forming an simulation-model.

BACKGROUND

A large portion of manufacturing involves producing complex shapes from sheet metal and then joining these parts together to form a structure. These individual shapes are created mainly by a process called stamping. In the stamping process a flat sheet of metal is placed inside a die set typically consisting of male and female tools that, when closed together in a press, form the sheet metal to the desired shape. The die surfaces are designed using computer aided design (CAD) software and are then machined into the tool steel to make the dies.

The initial process of creating the die surface typically includes the use of Finite Element Analysis (FEA) software to predict how the metal will deform when the die is closed. This deformation includes effects like stretching, wrinkling and spring-back.

Spring-back is particularly challenging to consider when creating die surfaces because spring-back will cause a sheet metal part to change shape upon removal from the die. Accounting for spring-back requires that the die surface be designed such that the expected spring-back will deflect the part to the desired shape. Failure to adequately adjust for spring-back will cause problems during assembly and adversely affect the fit of parts.

Said FEA software is used to calculate the die surface shape needed to produce the desired final shape for the component. Due to the complex behaviour of the metal as it is being deformed when the die closes, FEA software is not able to predict the correct die face shape that is needed to actually arrive at the desired shape.

After the die is produced and during initial try out, parts are stamped and checked to see if they have the correct shape within manufacturing tolerances. If the part fails to meet specifications, then the die surface must be reworked. This process involves making changes to the die surface to correct regions that correspond to areas where the part is not meeting specifications. This is a mostly manual process performed by manufacturing engineers.

Typically, the parts formed in the tryout phase are measured using metrology equipment such as white light systems or laser scanners. This produces an electronic representation of the actual manufactured part. This representation is compared to the CAD model of the desired part and areas of deviation are measured and highlighted using colours. These deviations are then used to determine where and how much the die surface needs to be manually adjusted to compensate for the deviation.

Generally, the deviations between the actual formed part and the ideal part (target formed part) are used to make adjustments to the die surface design. Using experience, an engineer will tweak these deviations and adjust the die surfaces in the CAD software. This new die face design is then re-machined onto the existing die.

The die try outs are repeated and a small number of parts are formed. These are again compared to the desired shape in the CAD model and if parts do not meet specifications, the process of refining the die face is repeated again. The average number of iterations needed to produce a "good" die face design is around four but can be as many as ten or more. Once the die face is producing parts of acceptable quality, the die is then shipped to the stamping plant so it can be used to produce production parts.

While the current state of the art has been used successfully for many years, there are some limitations. The number of iterations needed to produce a good die face is undefined and makes planning difficult. Each time the die face needs to be modified, it takes around four weeks. This adds significant cost and effort to producing a die and can delay the launch of a product.

The computation of the new die face is a manual process based on experience. There is some trial and error involved and often the new die face does not correct all the problems of the prior one. The need for highly skilled engineers is also a limiting factor since it takes many years of experience to become expert in this process.

The use of an FE-analysis to help design the die face has improved initial die face quality but it is not able to fully account for the behaviour of the metal as it deforms when the die closes. The behaviour of newer materials such as high strength steel and aluminium are even more difficult to predict and result in substantially longer periods of time to iterate to an acceptable quality.

SUMMARY

The invention relates to a method for designing a die surface of a die intended for forming a workpiece into a target formed part, comprising generating a workpiece simulation-model corresponding to the workpiece, generating a target simulation-model corresponding to a target formed part, determining an initial die surface, which an initial numerical simulation predicts as forming the workpiece simulation-model into the target simulation-model, with a die having the initial die surface, forming the workpiece into an actual formed part, by measuring the actual formed part, generating a numerical representation of the actual formed part, based on the numerical representation of the actual formed part, generating an actual simulation-model, determining residual stresses resulting from forming the workpiece simulation-model into the target simulation-model or the actual simulation-model, based on the residual stresses, matching the actual simulation-model and the target simulation-model, based on deviations between the matched target simulation-model and actual simulation-model, modifying the initial numerical simulation to provide a modified numerical simulation, and determining a corrected die surface, which the modified numerical simulation predicts as forming the workpiece simulation-model into the target simulation-model.

Generating the actual simulation-model may comprise modifying the target simulation-model such that the shape of the target simulation-model adapts to the numerical representation of the actual formed part.

The residual stresses may be determined as a plurality of stress tensors, and each stress tensor may be assigned to a location on or within the target simulation-model or the actual simulation-model.

Based on the stress tensors, weightings may be provided wherein each weighting is assigned to a location on or within the target simulation-model or the actual simulation-model. Matching the actual simulation-model and the target simulation-model may then be based on these weightings.

The stress tensors and the weightings may be related in an inversely proportional way, such that the higher a magnitude of a stress tensor is, the lower the weighting is.

Matching the actual simulation-model and the target simulation-model may comprise determining minimal deviations between the actual simulation-model and the target simulation-model under consideration of the weightings, such that the higher the weighting at a certain location is, the closer the actual simulation-model and the target simulation-model are.

The target simulation-model and the actual simulation-model may each comprise a set of vertices, and at least one of the stress tensors and the weightings may be assigned to the vertices of the target simulation-model or the actual simulation-model.

When the target simulation-model and the actual simulation-model each comprise a set of vertices, the deviations between the matched target simulation-model and actual simulation-model may be characterised by a set of vertex deviations, each vertex deviation being a position difference between a vertex of the target simulation-model and a corresponding vertex of the actual simulation-model.

Modifying the initial numerical simulation may comprise amending physical properties of the workpiece material or the target formed part material.

The actual numerical representation may be a three-dimensional point cloud.

Based on deviations between the initial die surface and the corrected die surface, visualisations or manufacturing instructions may be generated for transforming the initial die surface into the corrected die surface.

The invention also relates to a computer program product with program code being stored on a machine readable medium or embodied as an electromagnetic wave, the program code being configured to execute the steps: generating a workpiece simulation-model corresponding to the workpiece, generating a target simulation-model corresponding to a target formed part, determining an initial die surface, which an initial numerical simulation predicts as forming the workpiece simulation-model into the target simulation-model, generating a numerical representation of an actual formed part, into which actual formed part a workpiece was formed with a die having the initial die surface, based on the numerical representation of the actual formed part, generating an actual simulation-model, determining residual stresses resulting from forming the workpiece simulation-model into the target simulation-model or the actual simulation-model, based on the residual stresses, matching the actual simulation-model and the target simulation-model, based on deviations between the matched target simulation-model and actual simulation-model, modifying the initial numerical simulation to provide a modified numerical simulation, in particular wherein modifying comprises amending physical properties of the workpiece material or the target formed part material, and determining a corrected die surface, which the modified numerical simulation predicts as forming the workpiece simulation-model into the target simulation-model.

With respect to the program code of the computer program product, generating the actual simulation-model may comprise modifying the target simulation-model such that the shape of the target simulation-model adapts to the numerical representation of the actual formed part.

With respect to the program code of the computer program product, the residual stresses may be determined as a plurality of stress tensors, and each stress tensor may be assigned to a location on or within the target simulation-model or the actual simulation-model.

With respect to the program code of the computer program product, based on the stress tensors, weightings may be provided wherein each weighting is assigned to a location on or within the target simulation-model or the actual simulation-model. Matching the actual simulation-model and the target simulation-model may then be based on these weightings.

With respect to the program code of the computer program product, the stress tensors and the weightings may be related in an inversely proportional way, such that the higher a magnitude of a stress tensor is, the lower the weighting is.

With respect to the program code of the computer program product, matching the actual simulation-model and the target simulation-model may comprise determining minimal deviations between the actual simulation-model and the target simulation-model under consideration of the weightings, such that the higher the weighting at a certain location is, the closer the actual simulation-model and the target simulation-model are.

With respect to the program code of the computer program product, the target simulation-model and the actual simulation-model may each comprise a set of vertices, and at least one of the stress tensors and the weightings may be assigned to the vertices of the target simulation-model or the actual simulation-model.

With respect to the program code of the computer program product, when the target simulation-model and the actual simulation-model each comprise a set of vertices, the deviations between the matched target simulation-model and actual simulation-model may be characterised by a set of vertex deviations, each vertex deviation being a position difference between a vertex of the target simulation-model and a corresponding vertex of the actual simulation-model.

With respect to the program code of the computer program product, modifying the initial numerical simulation may comprise amending physical properties of the workpiece material or the target formed part material.

With respect to the program code of the computer program product, the actual numerical representation may be a three-dimensional point cloud.

With respect to the program code of the computer program product, based on deviations between the initial die surface and the corrected die surface, visualisations or manufacturing instructions may be generated for transforming the initial die surface into the corrected die surface.

The invention comprises the use of any numerical simulation, such as a Finite Element Analysis or other structural analyses which simulate the deformation of featured parts and assemblies, for computing a new die face during the try out iterations. Said numerical simulation may use meshed models (as they are used in FE-analysis) or unmeshed models (as they are used in new simulation approaches). In order to "learn from evidence", the numerical simulation uses as inputs: an electronic representation of the die surface, a model of the desired part and a model of the actual formed part from the die try outs.

The numerical simulation is used to compute the susceptibility to spring-back across the part surface. This information will be used to align the measured actual part data to the desired part data ("matching") in a way that isolates the effects of spring-back as best as possible.

Then the numerical simulation may use the difference between the formed part and the theoretical desired part to generate a feedback loop. This feedback loop will "correct" the spring-back prediction in the numerical simulation to match the behaviour demonstrated in the try out. In particular, the prediction is corrected or improved by modifying the physical material properties which are used in the numerical simulation (e.g. as parameters).

The numerical simulation may then use the corrected spring-back prediction to better predict a corrected die face which would be needed to produce the desired part shape.

This "learned" correction of the numerical simulation may also be used to improve the initial die face calculations, thus reducing the need for the iterative changes normally required to arrive at a die face that produces parts of an acceptable quality.

The invention also allows an engineer to limit changes to the die face to specific regions of the die face. This minimises the rework or re-machining of the die face by concentrating on the areas where the more significant quality problems are.

In order to provide an actual simulation-model, which represents the part as it has been actually formed by a die surface, a target simulation-model of a (desired) target formed part may be fitted to a numerical representation (e.g. a measured point cloud) of the actual formed part. The actual simulation-model may also be generated directly from such a numerical representation, but these directly created models are very different in organisation and structure compared to the meshes generated by numerical simulation software from the CAD model. In particular, said models generated from the numerical representation may be noisy and may have missing areas of the surface that were missed in the measurement process. A better model of the actual part is therefore achieved by fitting the smooth and complete simulation-model of the desired part to the measured data. However, it is not essential for the invention how exactly the numerical representation of the actual part is utilised to generate the actual simulation-model.

When the deformation process is calculated within the numerical simulation, residual stresses remaining in the formed part are determined. This may be performed with the target simulation-model or with the actual simulation model. In a certain resolution, said residual stresses may be distributed as stress tensors all over or within the simulation-model of the formed part. If the simulation-model is a Finite Element (FE)-mesh, the residual stresses (or stress tensors, respectively) may be assigned to the vertices of the FE-mesh.

These residual stresses, in particular the stress tensors or magnitudes thereof, may be used as weightings for the step of matching the actual simulation-model and the target simulation-model. The weightings may result from calculations or from direct deductions from the residual stresses (or stress tensors or magnitudes thereof, respectively).

Matching the actual simulation-model and the target simulation-model is an alignment process with respect to six degrees of freedom. Instead of minimising the distance between the two models with respect to every location of the part, according to the invention, the determined weightings are influencing this matching process.

In particular, this influence is realised by giving emphasis to those regions that have little residual stress. Lower weightings may be assigned to locations having relatively high residual stress. For the matching step, this means that the minimal deviations between the actual simulation-model and the target simulation-model may be determined under consideration of the weightings, which leads to the situation that the higher the weighting at a certain location is, the closer the actual simulation-model and the target simulation-model are in this certain location, and vice versa, the lower the weighting at a location is, the further away the actual simulation-model and the target simulation-model are in this location.

Accordingly, the weightings and the residual stress may be related inversely proportionally.

The deviations that result from this matching step are then used, according to the invention, to modify the numerical simulation that has been used initially. This modified numerical simulation may have amended physical properties of the material of the part compared to the initial numerical simulation. Thereby, the behaviour of the part material may be amended, allowing for a better predictability of phenomena like spring-back.

With the modified numerical simulation, a corrected die surface is determined. The numerical simulation predicts the corrected die surface to form the workpiece simulation-model into the target simulation-model.

One advantage of the proposed invention is a reduction of the need for re-works: the new "learning" numerical simulation algorithm reduces the number of iterations to the die face by converging more quickly on the needed shape, reducing the time to compute a new version of the die face by eliminating the manual experienced based process of adjusting the CAD model, allowing the user to select regions of interest where the "learning" algorithm may compute the "best" die face in these regions. The rest of the die face design would be left unchanged to minimize re-work.

BRIEF DESCRIPTION OF THE DRAWINGS

In the following, the invention will be described in detail by referring to exemplary embodiments that are accompanied by figures, in which.

DETAILED DESCRIPTION

FIGS. 1a to 1d show two exemplary manufacturing processes of forming a workpiece 10/10' into an actual formed part 20/20'. In the embodiment on the left side, which abstractly shows a conventional stamping machine, the die comprises the die surface 30. In the embodiment on the right side, which abstractly shows a fluid forming machine, the die comprises the die surface 30'. The invention, however, is also compatible with other manufacturing processes as long as they relate to forming and comprise a die with a die surface intended for forming a workpiece into a formed part.

Figure 1A:
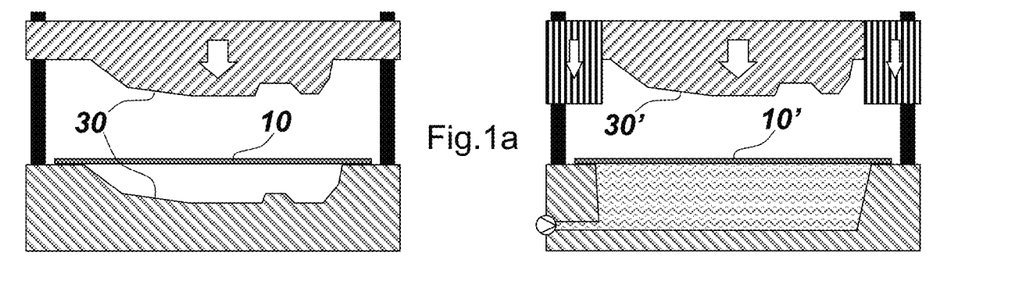
FIG. 1a-d: are cross-sectional views of two different dies in a forming process.
Figure 1B:
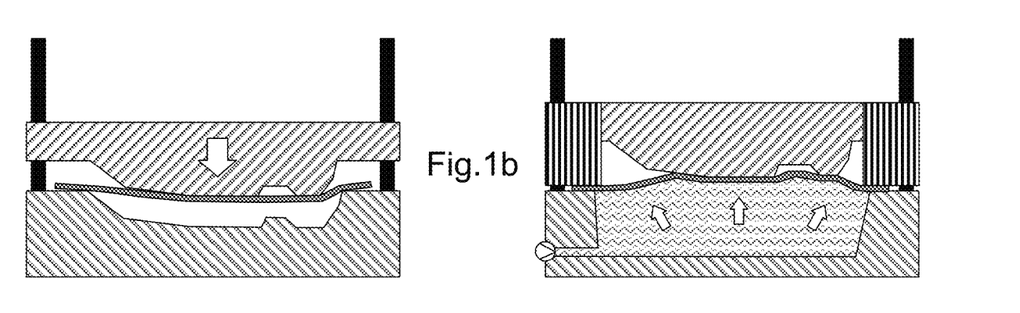
Figure 1C:
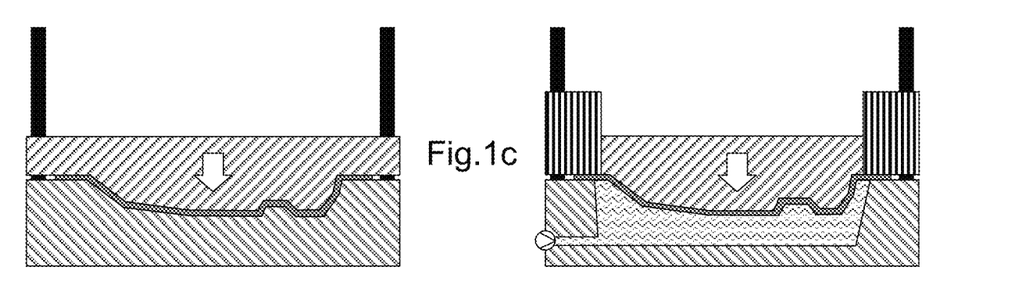
Figure 1D:
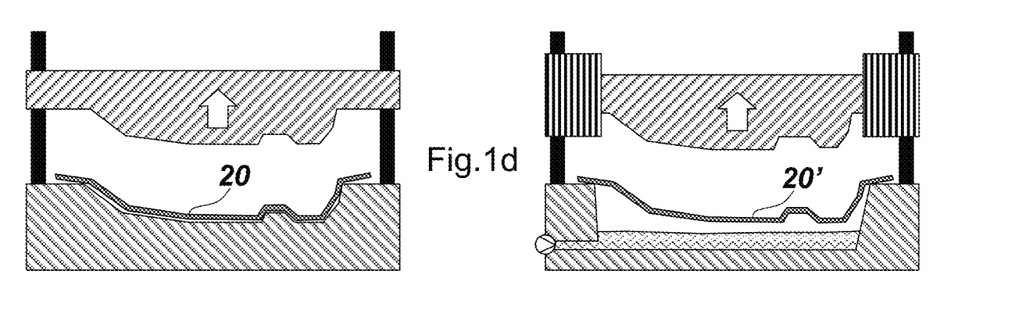

As indicated in FIG. 1d, in both cases residual stresses resulting from the forming process cause spring-back in the actual formed part 20/20', when it is released from the die surface. The residual stresses are mostly responsible for the part deviating from the surface of the die. In particular, the present invention provides a more accurate prediction of such spring-back. Such prediction allows for designing the die surface in such a way that the part arrives at the desired shape despite the spring-back.

Figure 2A:
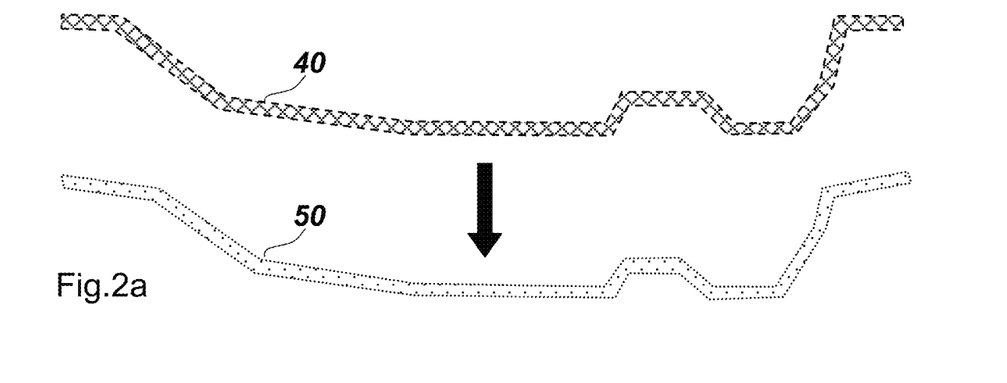
FIG. 2a-c: are cross-sectional views of the target FE-mesh and the numerical representation of the actual formed part, wherein the figures indicate the shape adaptation process of the former to the latter.
Figure 2B:
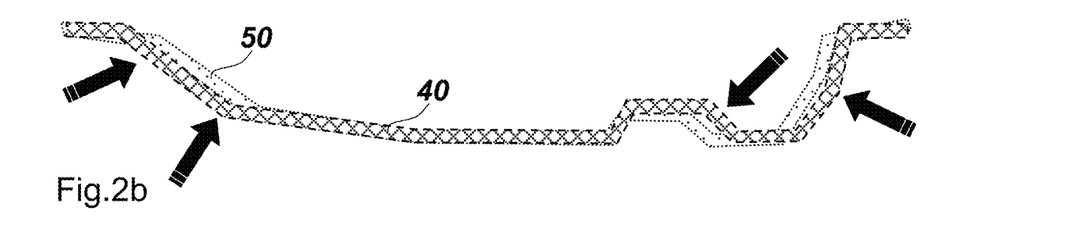
Figure 2C:
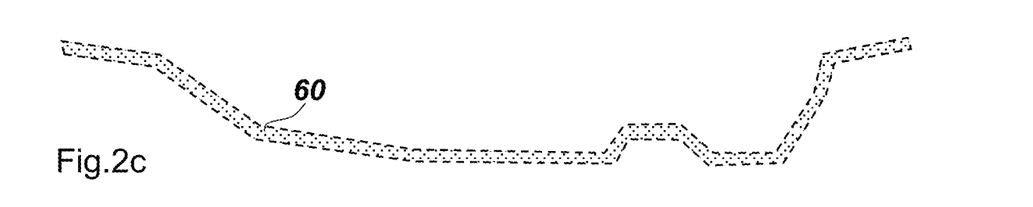

FIGS. 2a, 2b, and 2c abstractly show an exemplary process of generating an actual simulation-model 60 based on a numerical representation of the actual formed part. The part models are shown here in a cross-sectional view and are shaded symbolically: the meshed filling and dashed outline indicate a FE-mesh as an exemplary target simulation-model 40, and the dots indicate a 3D point cloud as an exemplary numerical representation 50).

The target simulation-model 40 may have been generated by a numerical simulation, such as e.g. FE-analysis software. Usually, such target simulation-models are generated based on CAD-models of a desired (target) formed part, and then are used in a numerical simulation for determining a die surface which would be needed to form the target formed part.

In case the target simulation-model 40 is embodied as a meshed FE-model, it may have a plurality of vertices (also known as nodes), which are the edges of the Finite Elements. By the shape formed by the elements/vertices, the target simulation-model 40 represents the shape of the target formed part.

This target shape may now be fitted to a numerical representation 50 of the actual formed part. The numerical representation may be a three-dimensional point cloud. Such a point cloud may for example be the outcome of a white light scan, blue light scan, laser scan or tactile measurement. Several different numerical representations of the same part may be generated and be averaged. As well, numerical representations may be generated for several different parts formed with the same die surface, and be averaged. Furthermore, from numerical representations of several different parts formed with the same die surface, several different simulation-models may be generated according to the invention, and said several different simulation-models may be averaged.

The target simulation-model 40 is modified until the shape of the numerical representation 50 of the actual formed part is reached, or reached in best possible approximation within given tolerances. This modification may comprise shaping the target simulation-model 40, or in particular, in case the simulation-model being embodied as FE-mesh, shifting vertices of the target FE-mesh 40 such that they best match the numerical representation. When the form of the point cloud 50 is reached (in best approximation), the now modified (formerly: target) simulation-model becomes the actual simulation-model 60. This results in a clean simulation-model representing the actual formed part.

There may however be other ways of generating an actual simulation-model representing an actual formed part, based on a numerical representation of the actual formed part. FIGS. 2a, 2b and 2c and the corresponding description only render one out of many possible ways to provide an actual simulation-model.

Figure 3:
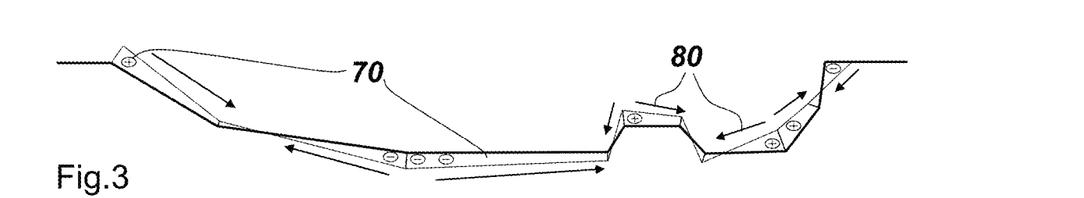
FIG. 3: is a cross-sectional view of the distribution of residual stresses within the formed part as computed by FE-analysis.

FIG. 3 shows an abstracted cross-section of the target formed part, wherein residual stresses 70 are indicated assigned to their according locations within the part. These residual stresses 70 are determined within a numerical representation by simulating a deformation.

The residual stresses 70 may be defined by a plurality of stress tensors assigned to locations on or within the simulation-model (actual or target). In case, the simulation-model is an FE-mesh, the tensors may be assigned to the vertices of the FE-mesh.

In the exemplary visualisation of the residual stresses according to FIG. 3 the stresses are related to a direction locally parallel or perpendicular to the part surface (plus may stand for tension and minus for compression). A three-dimensional view of the part with a visualisation of the residual stresses may accordingly be designed as a colour map, wherein a colour tone is linked with a value.

Many different evaluations of these residual stresses may be performed, such as the calculation of averaged or non-averaged magnitudes with or without consideration of averaged orientations of the stress components of the tensors. As a consequence, weightings may be derived from the residual stresses, which may be generally inversely related to the residual stresses (e.g. their absolute values). These weightings may then be used as a representative for the residual stresses in matching the actual simulation-model with the target simulation-model (described in and with the FIGS. 4a, 4b, and 4c).

The arrows 80 in FIG. 3 indicate the re-distribution of (initially equal) weightings to the areas where the residual stresses are low. The weightings relate to the residual stresses in so far as they are smaller, the larger the residual stresses are. In other words, they may have an —at least to some extent—inversely proportional behaviour.

Figure 4A:
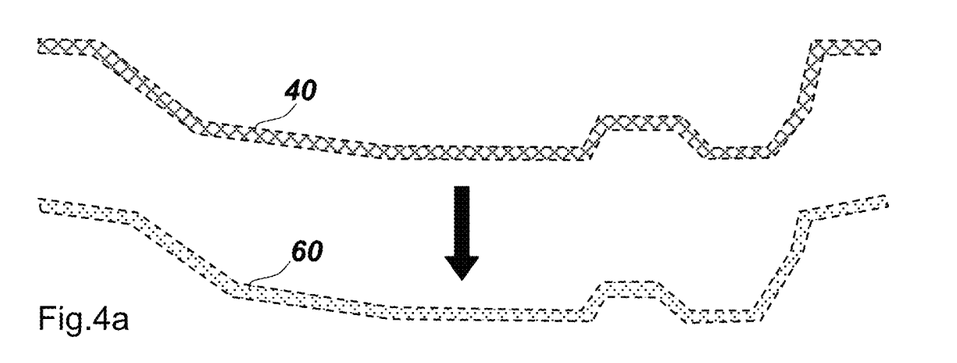
FIG. 4a-c: is a cross-sectional view of the actual FE-mesh and the target FE-mesh, wherein the figures indicate the matching process of the two meshes under consideration of the determined residual stresses.
Figure 4B:
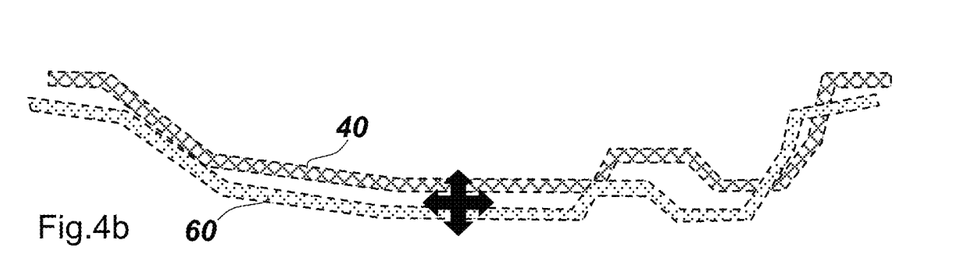
Figure 4C:
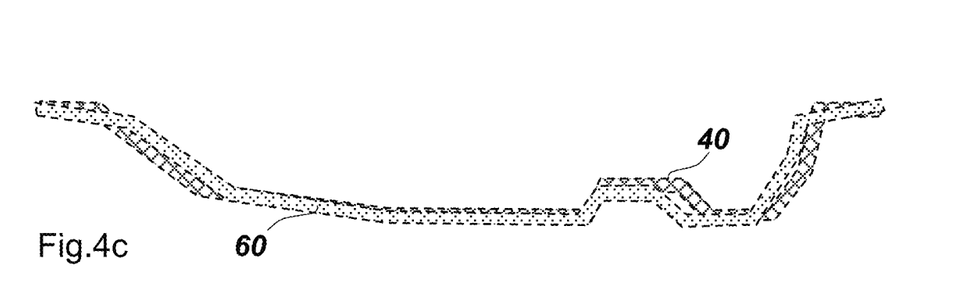

FIGS. 4a, 4b, and 4c relate to said matching of the target simulation-model 40 and the actual simulation-model 60. The matching is performed in any mathematical way known in the art, such that the two simulation-models take a best fit relative to each other, according to e.g. the least square method.

However, the weightings of the vertices are thereby considered bringing the models closer at those areas where the weightings are higher. In this way, the matching is performed in order to arrive at (not equal, but) adjusted minimal deviations, wherein locations within the part having least residual stresses are favoured when fitting. Thus, errors, i.e. deviations (see FIG. 5) between the actual and the target simulation-model, are shifted to the areas having most residual stresses. The simulation-models (target and actual) matched under consideration of the weightings (which are based on the residual stresses) are shown in FIG. 4c. The deviations (FIG. 5) between the actual simulation-model and the target simulation-model depend on how the two simulation-models are matched relative to each other. And the matching in turn depends on where the most residual stresses remain in the formed part.

The matching may be considered being an "aligning", i.e. bringing the simulation-models in position relative to each other with best match. However, normally in this process equal weights are used everywhere within the models when minimising the deviations all over. According to the invention, the models have locally assigned individual weightings which are determined based on the distribution of residual stresses within the part.

Figure 5:
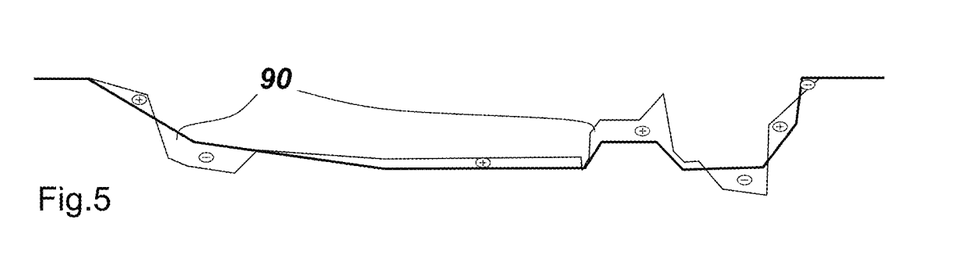
FIG. 5: is a cross-sectional view of one embodiment of highlighting deviations between the matched actual formed part and the target formed part.

Referring to FIG. 5, the deviations 90 resulting from the matching are depicted with reference to a line representing the actual formed part or the target formed part. This is one exemplary way how the deviations may be highlighted or visualised. For every locations on the part (in a certain resolution), a position delta may be computed to provide a set of deviations, which may also be referred to as a three-dimensional deviation map or matrix. The deviations then are used to modify the numerical simulation, e.g. amending the used function parameters regarding the material properties of the workpiece, or part, respectively. By this, the invention may provide better predictability of the consequences of residual stresses, i.e. elastic and plastic deformation behaviour.

The initial numerical simulation is hence modified by considering the deviations between the target simulation-model and the actual simulation-model (which deviations depend on residual stresses). With such modified numerical simulation then, a corrected die surface may be determined, which is predicted as forming the workpiece simulation-model into the target formed part simulation-model. The initial die surface may then be re-shaped manually or with help of NC machines to arrive at the corrected die surface.

Although the invention is illustrated above, partly with reference to some preferred embodiments, it must be understood that numerous modifications and combinations of different features of the embodiments can be made. All of these modifications lie within the scope of the appended claims.

What is claimed is:

1. A method for designing a die surface of a die intended for forming a workpiece into a target formed part, the method comprising:
    generating a workpiece simulation-model corresponding to the workpiece;
    generating a target simulation-model corresponding to a target formed part;
    determining an initial die surface, which an initial numerical simulation predicts as forming the workpiece simulation-model into the target simulation-model;
    forming the workpiece into an actual formed part with a die having the initial die surface;
    generating a numerical representation of the actual formed part by measuring the actual formed part;
    generating an actual simulation-model based on the numerical representation of the actual formed part;
    determining residual stresses resulting from forming the workpiece simulation-model into the target simulation-model or the actual simulation-model;
    based on the residual stresses, matching the actual simulation-model and the target simulation-model;
    modifying the initial numerical simulation to provide a modified numerical simulation based on deviations between the matched target simulation-model and actual simulation-model, and
    determining a corrected die surface, which the modified numerical simulation predicts as forming the workpiece simulation-model into the target simulation-model,
    wherein the residual stresses are determined as a plurality of stress tensors, and wherein each stress tensor is assigned to a location on or within the target simulation-model or the actual simulation-model,
    wherein based on the stress tensors, providing weightings, wherein each weighting is assigned to a location on or within the target simulation-model or the actual simulation-model,
    wherein matching the actual simulation-model and the target simulation-model is based on the weightings, and
    wherein matching the actual simulation-model and the target simulation-model comprises generating the weightings, such that the higher the weighting at a certain location is, the closer the actual simulation-model and the target simulation-model are, and determining minimal deviations between the actual simulation-model and the target simulation-model based on the generated weightings thereby matching the actual simulation-model and the target simulation-model.

2. The method according to claim 1, wherein generating the actual simulation-model comprises modifying the target simulation-model such that the shape of the target simulation-model adapts to the numerical representation of the actual formed part.

3. The method according to claim 1, wherein the stress tensors and the weightings are related in an inversely proportional way, such that the higher a magnitude of a stress tensor is, the lower the weighting is.

4. The method according to claim 1,
    wherein the target simulation-model and the actual simulation-model each comprise a set of vertices, and
    wherein at least one of the stress tensors and the weightings are assigned to the vertices of the target simulation-model or the actual simulation-model.

5. The method according to claim 1, wherein the target simulation-model and the actual simulation-model each comprise a set of vertices, and
    wherein the deviations between the matched target simulation-model and actual simulation-model are characterised by a set of vertex deviations, each vertex deviation being a position difference between a vertex of the target simulation-model and a corresponding vertex of the actual simulation-model.

6. The method according to claim 1, wherein modifying the initial numerical simulation comprises amending physical properties of the workpiece material or the target formed part material.

7. The method according to claim 1, wherein the actual numerical representation is a three-dimensional point cloud.

8. The method according to claim 1, further comprising:
    based on deviations between the initial die surface and the corrected die surface, generating visualisations or manufacturing instructions for transforming the initial die surface into the corrected die surface.

9. A computer program product with program code being stored on a non-transitory tangible machine storage medium, the program code being configured to execute a method comprising:
    generating a workpiece simulation-model corresponding to the workpiece;
    generating a target simulation-model corresponding to a target formed part;
    determining an initial die surface, which an initial numerical simulation predicts as forming the workpiece simulation-model into the target simulation-model;
    generating a numerical representation of an actual formed part, the numerical representation including a set of numeric data corresponding to the actual formed part formed with a die using the initial die surface;
    generating an actual simulation-model based on the numerical representation of the actual formed part;
    determining residual stresses resulting from forming the workpiece simulation-model into the target simulation-model or the actual simulation-model;
    matching the actual simulation-model and the target simulation-model based on the residual stresses;
    based on deviations between the matched target simulation-model and actual simulation-model, modifying the initial numerical simulation to provide a modified numerical simulation; and
    determining a corrected die surface, which the modified numerical simulation predicts as forming the workpiece simulation-model into the target simulation-model,
    wherein the residual stresses are determined as a plurality of stress tensors, and
    wherein each stress tensor is assigned to a location on or within:

the target simulation-model or
the actual simulation-model,
wherein the program code is further configured to:
based on the stress tensors, providing weightings, wherein each weighting is assigned to a location on or within:
the target simulation-model or
the actual simulation-model,
wherein the stress tensors and the weightings are related in an inversely proportional way, such that the higher a magnitude of a stress tensor is, the lower the weighting is,
wherein matching the actual simulation-model and the target simulation-model is based on the weightings; and
wherein matching the actual simulation-model and the target simulation-model comprises generating the weightings, such that the higher the weighting at a certain location is, the closer the actual simulation-model and the target simulation-model are, and determining minimal deviations between the actual simulation-model and the target simulation-model based on the generated weightings thereby matching the actual simulation-model and the target simulation-model.

10. The computer program product according to claim 9, wherein generating the actual simulation-model comprises modifying the target simulation-model such that the shape of the target simulation-model adapts to the numerical representation of the actual formed part.

* * * * *